Patented Nov. 11, 1941

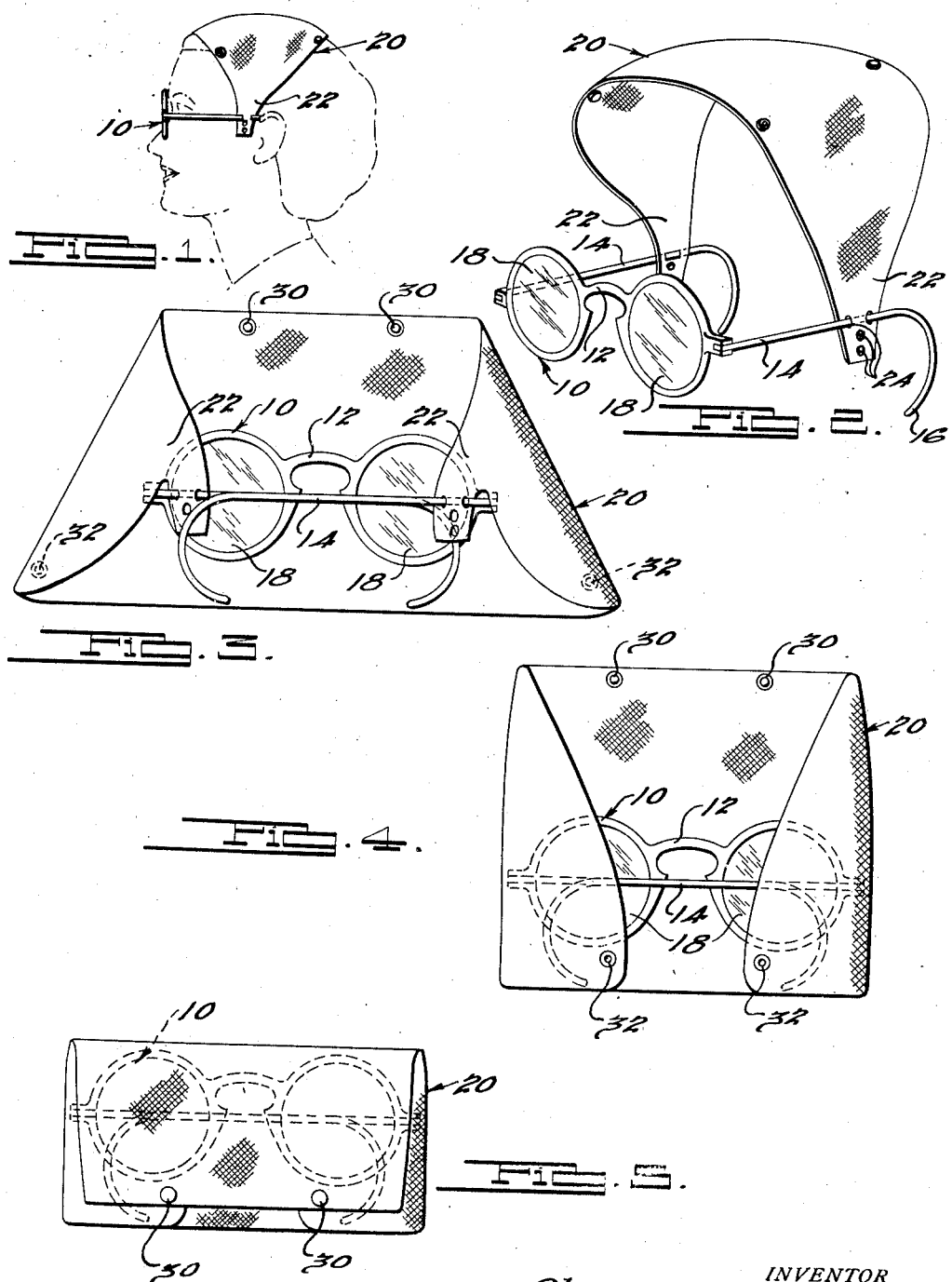

2,262,142

UNITED STATES PATENT OFFICE 2,262,142

EYEGLASS COMBINATION

Charles O. Karmsen, Detroit, Mich.

Application August 25, 1939, Serial No. 291,960

3 Claims. (Cl. 2—13)

This invention relates to a combination of a head covering and eye glasses, the principal object being the provision of the combination of this type that is simple in construction, attractive in appearance and convenient to wear.

The head covering referred to as a "hood" in the following specification and claims will be understood to mean a piece of fabric or other suitable readily flexible material of a limp nature adapted to extend across the head of the wearer and lie directly upon the hair thereof and to such extent as to cover either a portion or all of the head of the wearer.

Objects of the invention include the provision of a head hood and a pair of eye glasses or spectacles operatively associated therewith; the provision of a head hood and eye glasses so constructed and arranged as to mutually contribute to the proper maintenance of both of them in their desired positions upon the head of the wearer; the provision of a head hood for maintaining the hair of the wearer in proper position and maintained in position upon the head of the wearer by means of a pair of eye glasses worn by the wearer; the provision of a hood and eye glass combination as above described in which the head hood is so constructed and arranged with respect to the eye glasses as to aid in the support of the eye glasses on the wearer; the provision of a construction as above described in which the hood is so constructed and arranged for engagement with the eye glasses as to permit it to be adjusted to properly accommodate heads of different sizes; and the provision of a construction as above described in which the hood is adapted to form a protective casing for the eye glasses when not in active use.

The above being among the objects of the present invention the same consists in certain novel features of construction and combinations of parts to be hereinafter described with reference to the accompanying drawing, and then claimed, having the above and other objects in view.

In the accompanying drawing which illustrates a suitable embodiment of the present invention and in which like numerals refer to like parts throughout the several different views:

Fig. 1 is a side elevational view showing the combination eye glasses and hood applied to the head of the wearer;

Fig. 2 is a perspective view illustrating the eye glasses and hood in combination in the approximate positions which they assume when applied to the head of the wearer;

Fig. 3 is a front elevational view showing the eye glasses folded and the hood in the initial position which it assumes while being applied to the eye glasses as a protective covering therefor;

Fig. 4 is a view similar to Fig. 3 but illustrating the hood in a subsequent or intermediate position in the folding thereof to provide a protective covering for the eye glasses;

Fig. 5 is a front elevational view showing the eye glasses in folded position and the hood in completely folded position thereabout to provide a protective covering therefor.

It is commonly understood that in warm weather many people dislike to wear hats but the absence of hats in many cases is inconvenient because of the wind disarranging the hair. To overcome this disadvantage many of such people and particularly, but not necessarily, girls and women prefer to tie a scarf or handkerchief over their heads to keep their hair in place yet dispensing with the necessity of a hat. Such scarfs or handkerchiefs are usually tied under the chin which feature is in and of itself more or less inconvenient, and this is particularly so where the wearer also employs eye glasses as the scarf passing over the side of the face interferes with the proper positioning of the bows of the eye glasses on the ears of the wearer. In view of the fact that such scarfs are worn in the summertime when the sun is bright, it is also the usual practice for persons wearing the same to wear a pair of glasses which usually, although not necessarily, have colored lenses to temper the effect of the sun on the eyes of the wearer.

The majority of such glasses with colored lenses are bought by the wearer at drug or department stores where no attempt is made to fit the glasses to the wearer. As a result such glasses are made to fit a person having a normal distance between the ears and the bridge of the nose and in many cases this distance is excessive so that the glasses have a constant tendency to slip down on the nose of the wearer. In accordance with one feature of the invention the hood is so arranged with respect to this point of connection with the eye glasses as to provide a support therefor between the ears and the bridge of the nose of the wearer and so as to aid in supporting the glasses in their desired normal position. This, of course, is accomplished by securing the sides of the hood to the bows of the glasses forwardly of the ear. At the same time, because of the interengagement of the bows of the glasses with the hood, the weight of the glasses and the engagement of the same with the head of the wearer serves to maintain the hood in proper position upon the head of the wearer. Thus the hood and the eye glasses mutually contribute to the proper positioning of each other and aid in the convenience and utility of the combination.

In order to permit the hood to be adjusted to fit the head of a particular wearer and compensate for differences in sizes of the head of different wearers, the connection between each side of the hood and the bow of the eye glasses is preferably made so as to permit adjustment thereof to vary the linear distance between the two bows of the glasses in operative position as measured over the length of the hood between them.

In employing a flexible limp hood in accordance with the present invention and in accordance with a further feature thereof the hood 20 may be so constructed and arranged that it may be folded about the eye glasses when the eye glasses are folded so as to form a protective covering or casing for the eye glasses. In accordance with this feature of the present invention means are preferably provided for maintaining the hood in folded and enclosing relation with respect to the eye glasses to prevent inadvertent displacement of the eye glasses therefrom.

Referring now to the accompanying drawing a pair of eye glasses are illustrated as having the usual frame indicated generally at 10 including the usual bridge or nose-piece 12 and also including the usual and conventional bows 14 pivotally secured to the frame 10 in a conventional manner and each terminating at its free end in a partial loop 16 adapted to engage over the ears of the wearer. The frame 10 also carries the lenses 18 which may be either of the colored or clear variety as desired. It is to be understood that the particular type of eye glasses shown are shown for the purpose of illustration only and not in a limiting sense.

The hood is illustrated generally at 20 and for the purpose of illustration only in the present case it is illustrated as being of a fore and aft length sufficient to cover the forward portion of the wearer's head and as having narrowed side extension portions 22 terminally engaged with the bows 14 of the eye glasses. While any suitable means may be provided for effecting cooperative engagement between the side pieces 22 of the hood 20 and the bows 14 of the glasses, one economical satisfactory way of effecting this result is illustrated in the drawing by providing a series of holes such as 24 in each side extension 22, the series extending longitudinally or vertically of such side extensions 22. These holes may be arranged in a single vertical series as illustrated by the two lower holes 24 in Figs. 1 and 2, either of which may receive the corresponding bow 14 of the eye glasses, or they may be arranged in a vertically directed series of two or more transversely spaced holes such as illustrated by the two upper holes 24 in Figs. 1 and 2 and through both of which the corresponding bow 14 of the eye glasses may be projected, or any suitable series of one or more holes as will be appreciated. It will be readily understood that by inserting the bows 14 through different holes 24 the length of the hood between the bows 14 of the eye glasses may be lengthened or shortened to accommodate the size of the head of the particular wearer.

In accordance with one feature of the present invention the side extensions 22 of the hood are so arranged as to engage the bows 14 of the glasses between the ear loop 16 and the frame 10, thus to provide points of support for the eye glasses intermediate the usual points of support therefor, namely the ears and the bridge of the nose of the wearer, thus to aid in preventing the glasses from slipping down on the bridge of the nose of the wearer where the distance between the ear loop 16 and bridge 12 is greater than that properly required to accommodate the wearer. Additionally the engagement of the side extension 22 of the hood 20 with the bows 14 of the eye glasses maintains the hood 20 in proper position upon the head of the wearer and thereby prevents the wind from displacing the hair of the wearer under the hood. For this reason this combination will be found unusually convenient for persons riding in open automobiles and in boats where they prefer to dispense with hats of the usual character.

The hood 20 is preferably made from a flexible limp fabric although it will be understood that it may be made from any suitable flexible limp material. It particularly lends itself to being constructed of brightly colored patterns which may or may not blend with the color of the frames or of the lenses of the eye glasses with which it is combined so as to make an attractive "summer set." Accordingly, it will be understood that the construction offers the possibility of making an attractive addition particularly to a girl's wardrobe.

The flexible limp characteristics of the hood 20 lends itself to the realization of a further feature of the present invention and that is the employment of the hood 20 as a protective covering for the eye glasses when the latter are in folded condition. The particular shape of the hood 20 shown in the drawing facilitates this use of it for this purpose. In employing the hood as a covering for the eye glasses the eye glasses may be first folded as illustrated in Fig. 3 upon which the hood 20 is laid flat over its central portion below it as illustrated in Fig. 3 and the end portion folded as illustrated over the outer ends of the glasses. In such case it will be noted that the lower corners of the end portion project materially outwardly beyond the sides of the flaps. These projecting end portions may then be folded inwardly as illustrated in Fig. 4 until the second line of fold lies vertically as viewed in the figure and substantially at the lateral limits of the frame 10 of the eye glasses, upon which that portion of the hood extending upwardly above the upper limit of the frame of the glasses may be folded forwardly and then downwardly as illustrated in Fig. 5 in which position the eye glasses are completely enclosed by the hood. Under such circumstances some means are preferably provided for maintaining the hood in its thus folded condition and while any suitable means may be provided for this purpose the particular means shown by way of illustration comprises two pair of interengageable snap fastener elements 30 and 32 fixed to the hood in the usual manner and adapted for engagement with each other in the usual manner when the hood is in the completely folded condition about the eye glasses as illustrated in Fig. 5.

Formal changes may be made in the specific embodiment of the invention described without departing from the spirit or substance of the broad invention, the scope of which is commensurate with the appended claims.

What I claim is:

1. In combination, a head piece made of limp material adapted to transversely overlie a top portion of the wearer's head in contact therewith and of such shape that said head piece does not operate in and of itself solely through its engagement with the head of the wearer to conveniently maintain its position upon the head of the wearer, eye glasses having lenses and a nose piece adapted to engage the wearer's nose, bows on said glasses having ear loops adapted to engage the wearer's ears, and downwardly projecting side extensions on said head piece which operatively engage said bows intermediate said ear loops and said lenses, said head piece operating through said engagement with said bows to aid in positioning said nose piece upon the wearer's nose, and said glasses operating through the same engagement to aid in maintaining said head piece against displacement upon the wearer's head.

2. In combination, a head piece adapted to overlie a portion of the wearer's head in contact therewith and of such shape that said head piece does not operate in and of itself solely through its engagement with the head of the wearer to conveniently maintain its position upon the head of the wearer, eye glasses having lenses and a nose piece adapted to engage the wearer's nose, bows on said glasses having ear loops adapted to engage the wearer's ears, and side extensions on said head piece which operatively engage said bows intermediate said ear loops and said lenses, said head piece operating through said engagement with said bows, to aid in positioning said nose piece upon the wearer's nose, and said glasses operating through the same engagement to aid in maintaining said head piece against displacement upon the wearer's head, said head piece being of such flexibility that said glasses may be folded and said head piece folded about said glasses to provide a protective covering therefore, and means carried by said head piece for maintaining the same in folded condition about said glasses.

3. In combination, eye glasses provided with bows having ear loops adapted to engage the wearer's ears and a nose piece adapted to engage the wearer's nose, a protective covering for said glasses adapted to permit said glasses to be folded and to fold about said glasses when said glasses are not in use, and means carried on said protective covering to maintain said covering folded about said glasses, said covering comprising a middle portion and side extensions, said extensions operatively engaging said bows forwardly of said ear loops and rearwardly of said nose piece, said middle portion being adapted to overlie a portion of the wearer's head in contact therewith when said glasses are in the normal position of use, said glasses and said covering serving to mutually aid in maintaining the position of each other upon the head of a wearer.

CHARLES O. KARMSEN.